United States Patent [19]

Popovici et al.

[11] 4,242,308
[45] Dec. 30, 1980

[54] CONTROLLABLE REACTION MEDIUM SINGLE REACTOR FOR PHOSPHORIC ACID PRODUCTION

[76] Inventors: Neculai Popovici, B-dul 1 Mai nr. 42-52; Mihail Dochia, B-dul 1 Mai nr. 164, both of Bucuresti; Mihai Dumitrescu, Str. Grindului nr. 2; Iosif Spirea, Str. Brebeni, Bloc 3, both of Ploiesti; Iacob Samoil, Sos. Oltenitei nr. 81, Bucuresti, all of Romania

[21] Appl. No.: 957,949

[22] Filed: Nov. 6, 1978

Related U.S. Application Data

[63] Continuation-in-part of Ser. No. 894,452, Apr. 7, 1978, abandoned.

[51] Int. Cl.² .......................... B01F 7/16; B01J 1/20; B01J 8/10
[52] U.S. Cl. .................................. 422/195; 422/228; 422/234; 422/236; 423/320
[58] Field of Search ............... 422/195, 228, 236, 193, 422/234; 423/320

[56] References Cited

U.S. PATENT DOCUMENTS

| | | | |
|---|---|---|---|
| 2,950,171 | 8/1960 | Macq | 422/225 |
| 3,170,761 | 2/1965 | Janikowski et al. | 423/320 |
| 3,415,629 | 12/1968 | Pelitti | 423/320 |
| 3,615,253 | 10/1971 | Warzel | 260/95 |

FOREIGN PATENT DOCUMENTS 640909 12/1963 France ......................... 422/236

*Primary Examiner*—Bradley R. Garris
*Attorney, Agent, or Firm*—Ladas & Parry

[57] ABSTRACT

Apparatus for the continuous production of phosphoric acid from phosphate-containing rock and sulfuric acid, consisting of a reaction tank with a cylindrical side wall and a planar horizontal bottom and cover, wherein the improvement comprises a rigid vertical internal S-shaped baffle with one end smoothly merging into the said cylindrical side wall of the reaction tank and the other end freely projecting into the tank so as to permit of free circulation and flow of the reaction mixture from one side of the baffle to the other but dividing the reaction tank into two distinct zones.

3 Claims, 4 Drawing Figures

CONTROLLABLE REACTION MEDIUM SINGLE REACTOR FOR PHOSPHORIC ACID PRODUCTION

This application is a continuation-in-part of application Ser. No. 894,452 filed Apr. 7, 1978 and now abandoned.

This invention relates to a single compartment reactor for the manufacture of phosphoric acid by the wet process from phosphate-containing rock and sulfuric acid with resultant formation of calcium sulfate as a by-product.

The decomposition of phosphate rock attacked by sulfuric acid involves a rather large reaction volume taking place at a low speed.

The known process procedure for the continuous manufacture by the wet process of phosphoric acid involve the use of multiple tank reactors mounted in cascade or a single large reactor which may be divided into compartments.

The cascade-type reactors differ widely from the point in their design and function.

A smaller first vessel called pre-mixer is used for the preparation of a mixture formed of phosphate and recirculated slurry. A second tank is provided for the homogenization of the mixture pouring from the first similar vessel.

The next succeeding tanks have higher capacities and are used for the achievement of reaction between the sulfuric acid and the phosphoric acid of a lower concentration resulting from the filtration with phosphate slurries at the preliminary mixing stage.

The number and the capacity of such reactors are so selected as to achieve the complete reaction of the phosphate feed. At the end of the multiple tank reactors, the slurry is partly recirculated to the first pre-mixer and partly introduced into a final buffer tank for filtration.

The cascade reactors permit control of the intermediate reaction stages but they have the inherent disadvantages of complexity and occupying a large space.

The approach made to simplify the apparatus by the concept of a single tank reactor has resulted in a useful volume increase of 20% compared to the cascade reactors. However, the single reactor does not permit the correct control of the process flow because the intermediate stages are altogether eliminated.

Other designs have been developed to improve the single reactor by providing it with compartments involving the intermediate control, but these single compartment reactors present themselves numerous disadvantages.

Another form of single reactor conceived was in the form of a polygonal vat, the number of walls varying from six to ten, of which two opposite walls are longer. Centrally disposed along the longitudinal axis of the tank is a vertical wall of which one end extends through a baffle to a side wall of the reactor tank. The reactants entering in on one side of the central wall are evacuated through the opposite side. The orifice made in a second baffle permits a slurry recirculation (French Pat. No. 1,526,980).

This type of reactor still presents a number of difficulties.

The polygonal configuration of the reaction tank makes the presence of corners and edges unavoidable, in which the solids from the suspension of reactants filter out thus limiting the reactor's capacity. The polygonal design in comparison with the cylindrical tank is less resistant to hydraulic shock.

The seam joining the centrally-disposed vertical wall and the oblique baffle along the side wall and the connection of that baffle to the said wall are not likely to show greater resistance, but to lead to still pockets permitting solids to filter out.

The orifice provided in the baffle for the purpose of slurry recirculation makes the reactants in the supply zone intermix with the final reaction product in the event that the agitators fail to operate.

BRIEF SUMMARY OF THE INVENTION

This invention relates to a reactor for production of phosphoric acid from phosphate-containing rock and sulphuric acid, which satisfactorily combines the advantages of cascade reactors concerning the process flow developing in stages and the control possibility during the reaction intermediate stages with those of a single tank regarding the space limitation.

Another object of the invention is to eliminate the drawbacks demonstrated by the compartment reactors and the polygonal tank with central wall and baffle.

BRIEF DESCRIPTION OF THE DRAWINGS

Reference is made to the accompanying drawings, wherein.

DETAILED DESCRIPTION

Figure 1:
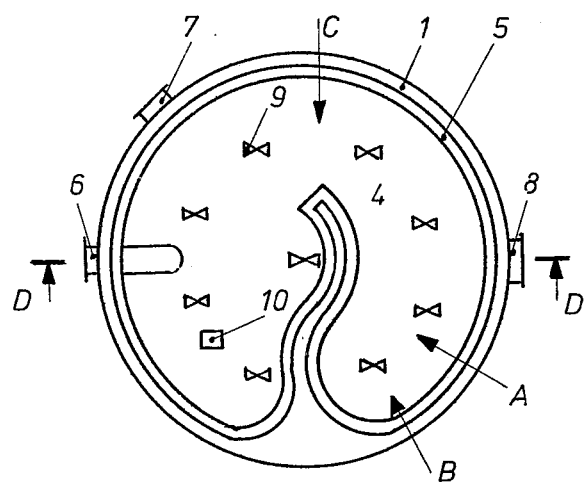
FIG. 1 is a schematic top plan view of one embodiment of a reactor according to the present invention with the cover removed.
Figure 2:
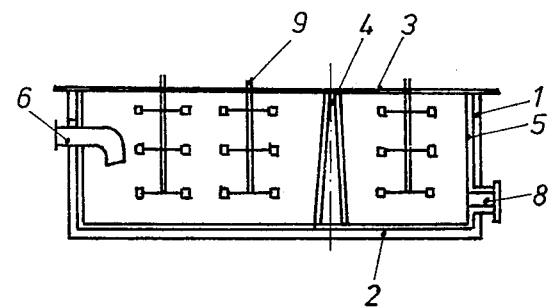
FIG. 2 is a sectional side view taken along D—D in FIG. 1.

Referring to FIGS. 1 and 2, the single tank reactor of the present invention shown comprises a generally cylindrical vessel having a bottom 2 and a planar horizontal cover 3. Inside the reactor vessel there is located an S-shaped vertical "baffle 4, of which one end merges into the side wall 5 of" the reactor, the other end being free. At the junction with the side wall of the reactor vessel, the baffle face has an arcuate configuration which prevents the formation of still pockets for the reaction fluid and the deposit of solid substances from the slurried reactants. The baffle extends the full height of the tank, with its lower part resting solidly on the reactor bottom 2 and its upper end supporting the cover 3.

It is obvious that the S-shaped baffle 4 could be reversed as a mirror image of the configuration shown in FIG. 1.

The cover 3 is provided with a number of openings required for the introduction of reactants into the reaction tank at the points marked A, B and C. A plurality of agitators 9 are so arranged in the reactor as to hold the substances in suspension and assure a homogenized slurry flow. A pump 10 is fitted for withdrawing the reaction product.

The cylindrical vessel wall is also provided with openings for slurry withdrawal and recirculation 6, a discharge outlet 7 at the reaction tank and an inspection manhole 8.

The side wall 5, the reactor bottom 2 and the sinusoidal baffle 4 are made either of carbon steel plate or concrete with a rubber lining giving inner protection, anti-acid brick and graphite brick. The cover 3 is made from metal and is protected on its inner face with a rubber lining or high alloy steel.

The S-shaped baffle divides the reaction tank into two zones.

The first zone to the right of the baffle, as shown in FIG. 1 is the so-called reaction zone with a smaller section and capacity.

The second zone adjacent the left face of the baffle is called the reaction completion zone, and has a higher capacity The approximate ratio of the cross-sectional area along the line D—D is 1:2.

The reactants consisting of phosphate containing rock, sulfuric acid, recirculated phosphoric acid, recirculated phosphate slurry with an anti-foaming agent are continuously introduced into the reaction zone through the inlets A and B, in the pockets formed between the right side of the baffle, the arcuate junction and the inner wall of the reaction vessel.

The agitators located in this zone provide for rapidly homogenizing the reactant mixture. Due to the sinusoidal shape of the baffle, the reaction mixture is forced to travel up to and around the tip of the baffle and along its front side up to a point when the reaction product is withdrawn by the filter feed pump 10.

The supply of reactants should be adjusted in such a manner as to permit a slight excess of $SO_4$ ions in the reaction zone, approximating 1.0–1.4%, which is thought to obtain the highest yield, and avoids the rapid precipitation of gypsum and coating of the mineral particles which would prevent the reaction coming to completion.

At the end of the first reaction zone at the point mark C, the excess of $SO_4$ ions appears to increase to 2.0–2.5% by the addition of sulfuric acid which causes the reaction to continue up to completion and the gypsum crystals to grow in the second reaction zone.

About the middle of the reaction completion zone, by means of a pump installed at the point 6 outside the reaction vessel, part of the phosphate slurry is withdrawn, cooled down and reintroduced into the circulating reactants through the reactant inlet.

The rest of slurry is directed to the filter pump. The ratio between the recycled slurry and that sent to filtration is of the order of 10:1. As outlined before, due to the sinusoidal configuration of the baffle 4, the area of the reaction zone is smaller than the reaction completion zone, which results in an increased rate of circulation and homogenization in the first zone, and to a longer residence time of the reaction mixture in the second zone. In the result of all this, there is obtained a suspension with large gypsum crystals which are uniform and easily filterable, and higher efficiency of the reaction exceeding 97%.

The configuration of the baffle radius, its position on the bottom of the reaction vessel, the arrangement of the inlets for the reactants and outlets for the recycled slurry can be varied depending on the grade of the commercial phosphate used for processing.

Figure 3:
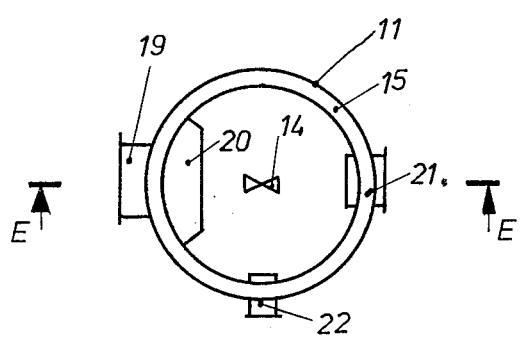
FIG. 3 is a top plan view of one embodiment of a pre-mixer used in the present invention with the cover removed.
Figure 4:
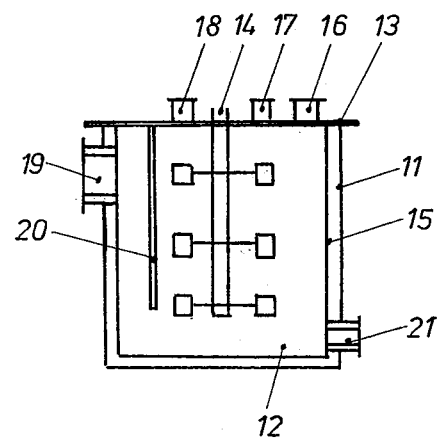
FIG. 4 is a sectional side view and taken along E—E in FIG. 3.

A variant of the invention shown in FIGS. 3 and 4 uses a pre-mixer wherein the reactant mixture is prepared before introducing it into the reaction vessel.

The pre-mixer consists of a vertical cylinder 11, with a bottom 12 and a planar, horizontal cover 13, providing with a single agitator 14. The bottom and the side wall of the pre-mixer are made of carbon steel plate lined with rubber foil, anti-acid brick and graphite brick 15. Both the cover and the agitator are made from high alloy steel which is resistant to attack from phosphoric acid.

Located on the cover 13 are openings 16 and 17 designed for introducing the reactants and a reaction gas exhaust outlet 18. The outlet 19 formed in the cylindrical wall 11 is intended for the discharge of the reaction mixture.

A vertical baffle 20 prevents the reactants from flowing directly from the supply inlets 16 and 17 to the discharge outlet 19, and in this way homogenization of the mixture is assured.

The capacity of the pre-mixer may widely vary but it is recommended that it bears a relation of 1 to 20 to the capacity of the reactor. The use of the pre-mixer renders the process of the flow control more flexible and permits higher efficiencies even when the phosphate grades used appear less reactive and have characteristics such as to make the processing difficult, i.e. have a higher content of organic substances.

Depending upon the characteristics of the processed rock, the process may be varied. Thus, if the rock used has a high reactivity and a relatively high content of $CO_2$ and organic matter, the feed introduced into the pre-mixer will consist of recirculated slurry and a mixture of recirculated phosphoric acid and sulfuric acid, while the phosphate rock is directly fed into the reactor. Alternatively, if the kind of rock used is of lower reactivity and tendency to foam, the recyled slurry along with phosphate rock is introduced into the pre-mixer and a mixture formed of recirculated phosphoric acid and sulfuric acid is added to the reactor proper. There are, however, cases when the rock used is of low reactivity and poor $CO_2$ and organic contents and when the best obtainable results can be obtained if all the reaction media are introduced into the pre-mixer. In all cases, a close control of the concentration in $SO_4$ ions is necessary and the proper corrections must be made in the reactor as the process goes on.

Two examples using the apparatus of the invention are given below:

EXAMPLE 1

A single reactor with an S-shaped baffle has been used to process finely-ground phosphate rock with the following composition:

|  | Percent (by weight) |
| --- | --- |
| $P_2O_5$ | 33.1 |
| CaO | 51.3 |
| $R_2O_3$ | 0.7 |
| $CO_2$ | 4.4 |
| $SiO_2$ | 3.4 |
| F | 3.6 |
| Bound water and organic matter | 1.7 |

FIGS. 1 and 2 are schematic views of the single reactor according to the invention with the ratio between the cross-sectional areas of the first and second zones being 1:2.

Through the feed hole made in the reactor cover 3 at the point marked A, recirculated slurry and finely-ground rock are introduced, while through suitably-disposed openings B and C suitable amounts of sulfuric acid and recirculated phosphoric acid enter the reactor. The amount of acid is adjusted to comply with the excess of $SO_4$ ions in the slurry and enhance the ratio of decomposition. Due to the direction of the rotation of agitators 9 and configuration of baffle 4, the mixture of reactants is directed toward the second reaction zone. The agitators located in each zone permit the mixture to be homogenized.

The reaction gases are vented off through an appropriate hood and are directed to a gas washer-scrubber.

Before reaching the suction orifice 6, part of the slurry is sucked up by the recirculating pump 10 and returned to the circulating mass through feed hole A passing first through a vacuum cooler in order to maintain the optimum temperature required for the reaction.

The slurry is conveyed to the submerged pump 10 for further treatment in the filter section. The ratio between the amount of recycled slurry and the slurry sent to the filters is about 10:1.

The suspension obtained in this manner contained large and uniform gypsum crystals which were easily filterable and washable. The filtration was performed on a tilting-bucket filter. The resultant product contained 30% $P_2O_5$ by weight of phosphoric acid and phospho-gypsum containing a total of 0.8–1.0% $P_2O_5$ of which 0.2–0.3% was soluble $P_2O_5$

EXAMPLE 2

To the single reactor described in Example 1 having attached the pre-mixer that can be seen in FIGS. 3 and 4, finely-ground phosphate rock was added with the following average composition:

|  | Percent (by weight) |
|---|---|
| $P_2O_5$ | 33 |
| CaO | 52 |
| $R_2O_3$ | 0.5 |
| $CO_2$ | 4.0 |
| $SiO_2$ | 2.6 |
| F | 3.7 |
| organic matter | 0.3 |

Recirculated slurry and recirculated phosphoric acid mixed with sulfuric acid were introduced into the pre-mixer. The agitator 14 effected an intimate and rapid homogenization of these reaction components that are successively passed by the overflow 19 to the single reactor provided with the sinusoidal baffle.

The finely-ground rock was introduced into the reactor directly along with the proportion of sulfuric acid necessary for the correction of $SO_4$ ions. The rest of the process flow follows the scheme described in Example 1.

The slurry obtained contained macro-crystals of gypsum and exhibited the best filtration and washing characteristics. The filtration operation was developed on a tilting-bucket filter.

The reaction products were: 30% $P_2O_5$ phosphoric acid and phospho-gypsum containing less than 0.8% $P_2O_5$ (total) of which 0.3% were soluble $P_2O_5$.

We claim:

1. In apparatus for the continuous production of phosphoric acid from phosphate-containing rock and sulfuric acid, consisting of a reaction tank with a vertical wall, a planar horizontal bottom and cover, and a rigid vertical baffle dividing the reaction tank into two distinct zones, a plurality of agitators to induce circulation and flow of the reaction mixture from one side of the baffle to the other, wherein the improvement comprises the following features:

(a) the reaction tank has a cylindrical side wall;
   (b) the vertical baffle is S-shaped with one end smoothly merging into the cylindrical side wall of the reaction tank and the other end freely projecting into the tank;
   (c) the S-shaped baffle extends the full height of the reaction tank and divides the reaction tank into two distinct zones;
   (d) a first reaction zone on one side of the baffle, having a smaller area and capacity, which initially receives the reactants;
   (e) a second, so-called reaction completion zone on the opposite side of the S-shaped baffle with greater capacity, wherefrom a recirculating slurry and reaction product are withdrawn, the approximate ratio between the capacities of said first and second reaction zones respectively being about 1:2; and wherein
   (f) the S-shape of the baffle forces the reaction mixture to travel around the tip of the baffle.

2. The apparatus as claimed in claim 1, wherein the cover of said reaction tank has at least one connection, enabling the $SO_4$ ion concentration in the reaction mixture to be adjusted during its movement from a supply inlet to the point where the reaction product is withdrawn.

3. The apparatus as claimed in claim 1, including a smaller cylindrical pre-treating vessel provided with at least one agitator into which the reaction mixture is first introduced.

* * * * *